US010429251B2

(12) United States Patent
Wu et al.

(10) Patent No.: US 10,429,251 B2
(45) Date of Patent: Oct. 1, 2019

(54) WIRELESS TEMPERATURE SENSOR FOR SOUS VIDE COOKING (71) Applicant: Anova Applied Electronics, Inc., San Francisco, CA (US)

(72) Inventors: Jeff Wu, Stafford, TX (US); Frank Wu, Stafford, TX (US)

(73) Assignee: Anova Applied Electronics, Inc., San Francisco, CA (US)

( * ) Notice: Subject to any disclaimer, the term of this patent is extended or adjusted under 35 U.S.C. 154(b) by 246 days.

(21) Appl. No.: 15/280,302

(22) Filed: Sep. 29, 2016

(65) Prior Publication Data

US 2017/0089768 A1    Mar. 30, 2017

Related U.S. Application Data (60) Provisional application No. 62/235,171, filed on Sep. 30, 2015.

(51) Int. Cl.
| G01K 13/00 | (2006.01) |
| G01K 1/00 | (2006.01) |
| G01K 7/00 | (2006.01) |
| A23L 5/10 | (2016.01) |
| A47J 27/10 | (2006.01) |
| G01K 1/14 | (2006.01) |

(Continued)

(52) U.S. Cl.
CPC ............... *G01K 13/00* (2013.01); *A23L 5/13* (2016.08); *A47J 27/10* (2013.01); *G01K 1/024* (2013.01); *G01K 1/14* (2013.01); *G01K 7/00* (2013.01); *G01K 7/02* (2013.01); *G01K 7/16* (2013.01); *H02J 7/025* (2013.01); *H02J 7/027* (2013.01); *A23V 2002/00* (2013.01); *G01K 2207/06* (2013.01); *H04W 4/70* (2018.02)

(58) Field of Classification Search
USPC ................ 374/208, 100, 141, 183, 185, 179
See application file for complete search history.

(56) References Cited

U.S. PATENT DOCUMENTS 9,603,477 B2    3/2017 Hoare et al.
9,692,784 B1*  6/2017 Nenov ................ H04L 63/1458
(Continued)

FOREIGN PATENT DOCUMENTS

CN    104296891 A    1/2015
CN    104640484 A    5/2015
(Continued)

OTHER PUBLICATIONS

International Search Report and Written Opinion for International Application No. PCT/US2016/054937, dated Dec. 21, 2016—9 Pages.

(Continued)

*Primary Examiner* — Mirellys Jagan
(74) *Attorney, Agent, or Firm* — RatnerPrestia (57) ABSTRACT

Wireless temperature sensor for sous vide cooking. Wireless sensor penetrates food and is sealed with the food in a bag for sous vide cooking. The wireless sensor communicates with the base sous vide system to read core food temperature to ensure pasteurization temperature and time is reached and to eliminate estimations with fat content, size of food in relation to cooking time by taking a direct read. The temperature sensor contains a battery, powered passible via peltier, or through induction.

18 Claims, 6 Drawing Sheets

(51) Int. Cl.
  *H02J 7/02*   (2016.01)
  *G01K 1/02*   (2006.01)
  *G01K 7/02*   (2006.01)
  *G01K 7/16*   (2006.01)
  *H04W 4/70*   (2018.01)

(56) References Cited

U.S. PATENT DOCUMENTS

| | | | |
|---|---|---|---|
| 2013/0220143 A1* | 8/2013 | Fetterman | A47J 36/2405 99/330 |
| 2014/0254625 A1 | 9/2014 | Faden | |
| 2014/0260998 A1* | 9/2014 | Pearson | A47J 27/002 99/288 |
| 2015/0064314 A1* | 3/2015 | Manuel | A47J 36/32 426/231 |
| 2015/0150403 A1* | 6/2015 | Wu | A47J 36/32 99/344 |
| 2015/0257574 A1* | 9/2015 | Hoare | A47J 27/10 99/342 |
| 2015/0342388 A1* | 12/2015 | Wu | A47J 27/10 700/300 |
| 2015/0351579 A1* | 12/2015 | Johncock | A47J 27/10 426/231 |
| 2016/0014849 A1* | 1/2016 | Hegedis | H05B 6/1263 219/627 |
| 2016/0037956 A1* | 2/2016 | Wu | A47J 27/10 99/403 |
| 2016/0192801 A1* | 7/2016 | Wu | A47J 27/10 426/231 |
| 2017/0020324 A1* | 1/2017 | Young | A47J 27/10 |
| 2017/0086258 A1* | 3/2017 | Burkhardt | H05B 1/0266 |
| 2017/0139385 A1* | 5/2017 | Young | G05B 19/048 |
| 2017/0188743 A1* | 7/2017 | Snyder | A47J 27/10 |
| 2018/0049579 A1* | 2/2018 | Puchinger | A47J 36/00 |
| 2018/0213963 A1* | 8/2018 | Morey | A47J 27/04 |
| 2018/0249735 A1* | 9/2018 | Espinosa | A23L 3/003 |
| 2018/0255957 A1* | 9/2018 | Wu | A23L 5/13 |

FOREIGN PATENT DOCUMENTS

| | | |
|---|---|---|
| DE | 102009042305 A1 | 3/2011 |
| EP | 1577653 A1 | 9/2005 |
| WO | 2009020959 A1 | 2/2009 |
| WO | 2014190160 A1 | 11/2014 |

OTHER PUBLICATIONS

European Communication Pursuant to Article 94(3) for European Application No. 167843184, dated Jun. 26, 2019, 7 pages.
Chinese Office Action for Chinese Application No. 201680057301.5, dated Jul. 9, 2019, with translation, 13 pages.

* cited by examiner

WIRELESS TEMPERATURE SENSOR FOR SOUS VIDE COOKING

FIELD OF TECHNOLOGY

The present disclosure relates generally to food cooking devices, and more specifically, to a wireless temperature sensor used for precision temperature controlled cooking apparatus designed for sous vide cooking.

BACKGROUND

Sous vide is a method of cooking food sealed in airtight plastic bags in a water bath for longer than normal cooking times at an accurately regulated temperature much lower than normally used for cooking, typically around 55° C. (131° F.) to 60° C. (140° F.) for meats and higher for vegetables. Current sous-vide equipment are built with temperature sensors immersed either in fluids or attached to the bottom of water bath or container.

While immersed sensors currently used are adequate for measuring temperature of the bath fluid or air in case of combi-ovens, sous vide cooking involved cooking food to a safe temperature inside a bag and many times the center of the food is not pasteurized or held at high enough temperature to pasteurize properly. In many cases chefs have had to use an accessory temperature probe inserted into the center of the food to take reading which causes problems from pierced bags that may leak and additional safety problems. By utilizing a wireless temperature sensor the sensor can be sealed in the with the food allowing easy temperature reads of the core temperature of food and bypassing piercing the bag which can lead to contamination or spilling of bag contents.

BRIEF DESCRIPTION OF THE DRAWINGS

In order to describe a manner in which features of the disclosure can be obtained, reference is made to specific embodiments that are illustrated in the appended drawings. Based on an understanding that these drawings depict only example embodiments of the disclosure and are not intended to be limiting of scope, the principles herein are described and explained with additional specificity and detail through the use of the accompanying drawings, wherein.

DETAILED DESCRIPTIONS

Various embodiments of the disclosure are discussed in detail below. While specific implementations are discussed, it should be understood that this is done for illustration purposes only. A person skilled in the relevant art will recognize that other components and configurations may be used without departing from the scope of the disclosure.

Several definitions that apply throughout this document will now be presented. "Circulating" means agitating, blending or mixing of one or more fluids. Hence a "circulator" is a device which can be configured to agitate, blend or mix a fluid. Fluids will be understood to comprise liquids. "Coupled" is defined as connected, whether directly or indirectly through intervening components and is not necessarily limited to physical connections. Coupled devices can be devices which are in signal communication with one another. "Connected" means directly connected or indirectly connected. "Wireless" can mean any form of wireless communication or connection from BLUETOOTH® to RF to optical.

Broadly speaking, this disclosure relates to cooking apparatus for food preparation with optional sous-vide functionality. More specifically, this disclosure relates to sous-vide circulator cookers. This application refers to a sous vide circulator cooker, sous-vide cooker, circulator cooker, and circulator interchangeably.

In at least one embodiment, a sous-vide cooker can be coupled with a wireless temperature sensor. The wireless temperature sensor can be sealed into a bag and can be water proof. The wireless temperature sensor can be configured to detect and transmit a temperature (e.g., food) to the sous-vide cooker. The sous-vide cooker can be configured to adjust cook time or water temperature in relation to the temperature transmitted by the wireless temperature sensor.

In at least one embodiment, the wireless temperature sensor is sealed against water and contains a battery. The wireless temperature sensor can be water-resistant or waterproof depending on the design, material, and construction of the wireless temperature sensor. The wireless temperature sensor can be sealed into the bag containing food to be cooked in the sous-vide cooker.

In at least one embodiment, the wireless temperature sensor can have a user replaceable battery. In another embodiment, the wireless temperature sensor can have a rechargeable battery (e.g., that can be charged wirelessly though induction, or charged by wired connection).

In another embodiment the wireless temperature sensor can have indicator configured to indicate a level of the battery, for example, a light that can alert to low battery. The wireless temperature sensor can have a light that illuminates a first color when the battery is at sufficient capacity, and illuminate a second color when the battery level falls below sufficient capacity. In another embodiment, the wireless temperature sensor can have a light that illuminates only when the battery is low, or when the battery level falls below sufficient capacity.

Disclosed is a wireless temperature sensor for a sous vide cooker. The sensor can include a temperature sensing mechanism coupled to a plurality of temperature sensor wires and configured to read a current temperature and a housing enclosing a controller, a wireless radio, and a plurality of temperature sensor wires, the controller configure to receive via the plurality of temperature sensor wires the current temperature; and the wireless radio configured to transmit the current temperature to the sous vide cooker.

In some embodiments, the controller is configured to transmit a new current temperature at predetermined intervals. The temperature sensing mechanism can be at least one of an RTD resistor, thermistor or thermocouple.

In some embodiments, the sensor can also include a peltier semiconductor wafer enabling the sensor to self-power though passive heat flow. In some embodiments, the sensor can include inductive element configured to charge the battery.

Disclosed is also a wireless temperature sensor for a sous vide cooker including an upper portion having a housing enclosing a controller, a wireless radio and a battery, a middle portion connected to the upper portion, comprising of a substantially hollow tube structure enclosing a plurality of temperature sensor wires therethrough, and a lower portion of the tube structure comprising a temperature sensing mechanism.

In some embodiments, the temperature sensing mechanism is configured to read and transmit a temperature to the controller; and the controller is configured to transmit the temperature via the wireless radio to a sous vide cooker.

Disclosed is a sous vide cooker including at least one processor; and at least one memory, the memory storing instructions which when executed by the processor cause the processor to: actuate a fluid agitation device and a heating element to heat a fluid of a fluid container to a predetermined temperature, receive, via a wireless network connection from a wireless temperature sensor in the fluid of the fluid container, a current temperature; and adjust the fluid agitation device and a heating element when the current temperature is not equal to the predetermined temperature. The cooker is also configured to transmit, via the wireless network connection to the wireless temperature sensor, a request for a temperature.

Figure 1:
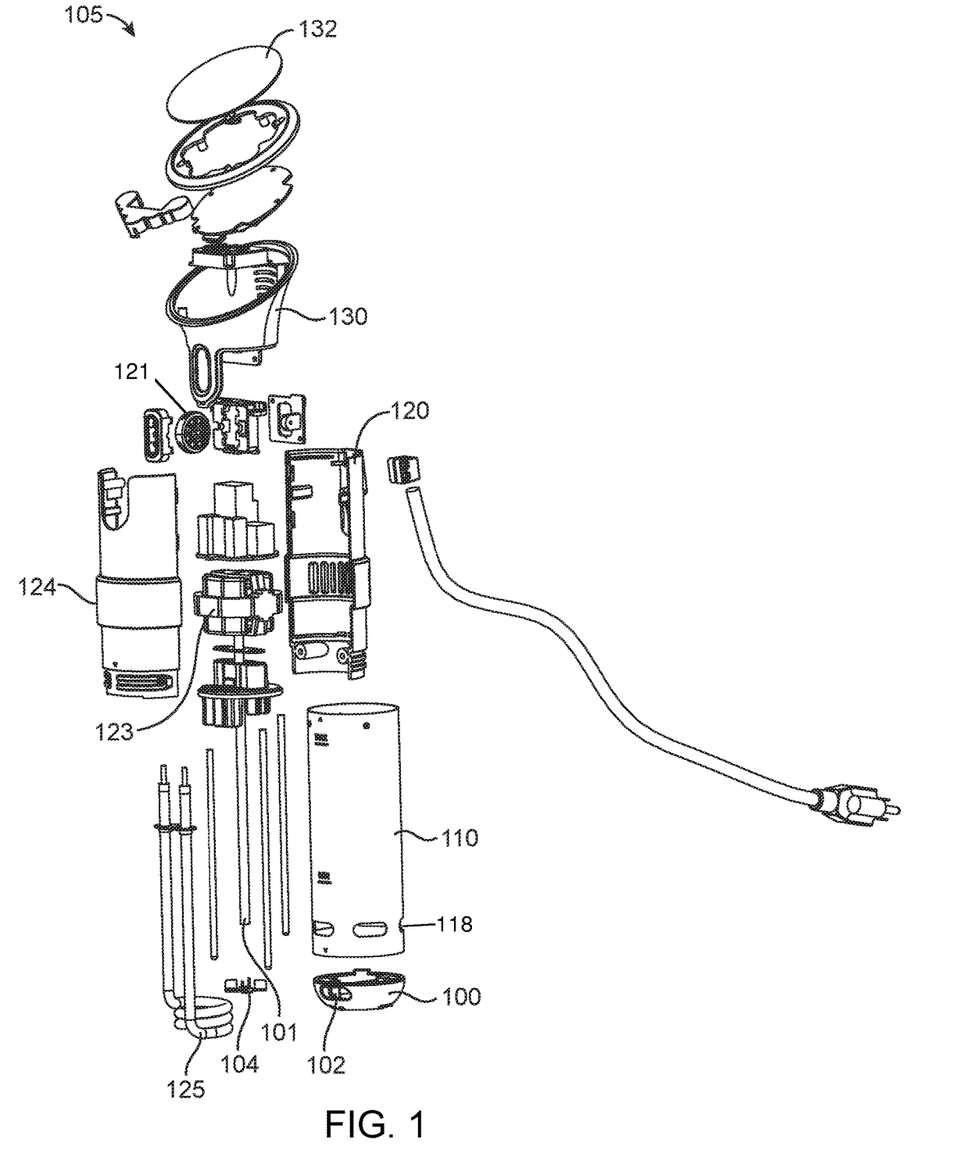
FIG. 1 is a cross-sectional view illustrating a fluidic temperature control device in accordance with an example embodiment.

FIG. 1 illustrates components of at least one embodiment of a fluidic temperature control device 105. In some embodies, device 105 can include three portions as illustrated in FIG. 1. In alternate embodiments fluidic temperature control device 105 can include two portions or one portion (e.g., upper and middle portions can be combined).

The device can include a lower portion 110. The lower portion 110 can be a removable, tool-less screw or clamp-on circulator pump housing or other agitation device housing. Lower portion 110 can include heaters 125, drive shaft 101 and impeller 104. The lower portion 110 can be composed of stainless steel or other suitable materials. In one embodiment, the lower portion 110 can be a removable clamp-on skirt. The lower portion 110 can be configured with one or more liquid intake (flow-in) openings 118. Alternatively, openings 118 can be liquid output (flow-out) openings. The device 105 can also include a liquid ejection (flow-out) cap 100 with one or more openings 102, on the side or bottom, through which fluid can pass (as liquid intake (flow-in) or liquid output (flow-out)). Middle portion 120 can enclose motor and heater base 123 connected to electric heaters 125. Middle portion 120 can also comprise a fan (not shown) to blow out any steam that may be present. Middle portion 120 can include collar 124 including one or more openings to provide ventilation to motor and heater base 123. The device 105 can also include an upper portion 130. The upper portion 130 can include a LCD display 132 with touch controls. In other embodiments, upper portion 130 can include a separate input device 121 (e.g., a scroll wheel, one or more buttons, etc.). Input device 121 and/or the touch controls of LCD display 132 can be configured to operate device 105 (e.g., set temperature, set time, select settings, etc.). Device 105 can be sealed against water/air and can be fully submersed for periods of time in the cooking container with the fluid being heated by the device.

Figure 2:
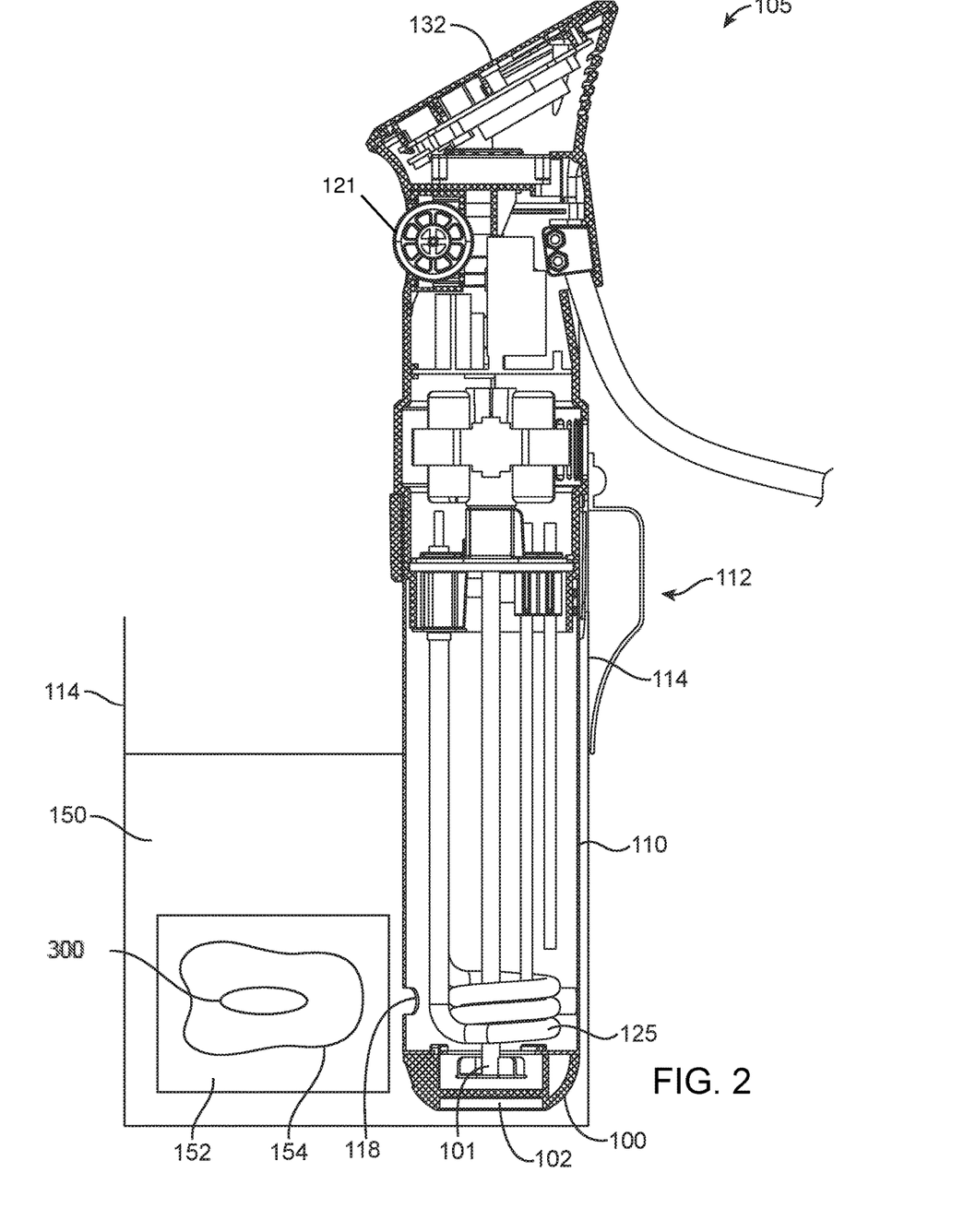
FIG. 2 is a cross-sectional view illustrating a fluidic temperature control device in accordance with an example embodiment.

FIG. 2 illustrates an example fluidic temperature control device 105 in communication with a wireless temperature sensor. Device 105 is adjustably attached, via clamp 112, to container 114 containing fluid 150 (e.g., water). The temperature of fluid 150 can be regulated by device 105, as previously described. The wireless temperature sensor 300 can be placed proximate (or within) the food 154 within a sealed container 152 (e.g., a plastic bag or plastic envelope) located in fluid 150. In another embodiment, the temperature sensor can be wired to and located at fluidic temperature control device 105. Wireless temperature sensor 300 can connect to and transmit temperature data to device 105. Wireless temperature sensor 300 can connect to and transmit temperature data to an electronic device in communication with device 105.

Figure 3:
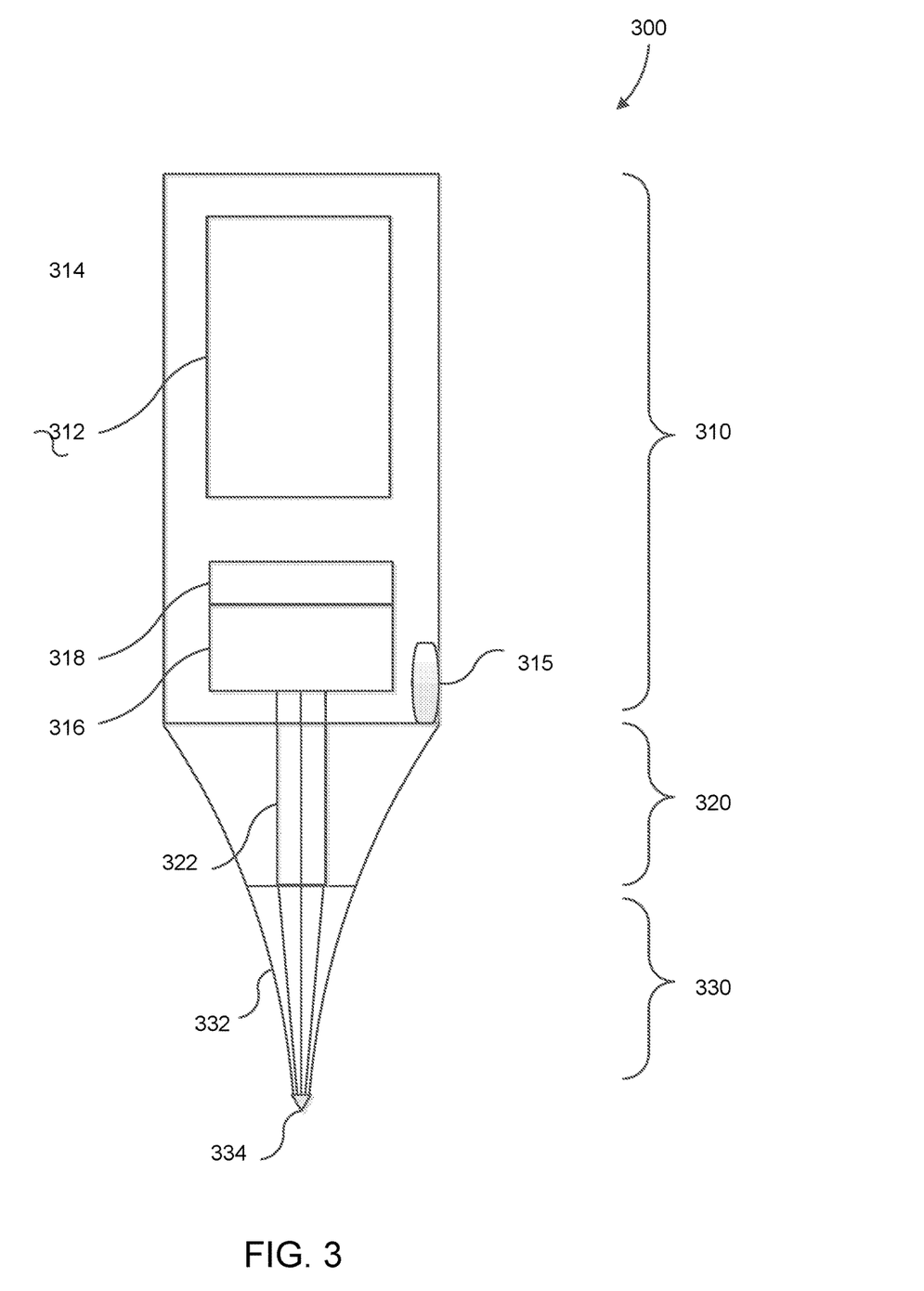
FIG. 3 is a view of an example embodiment of a wireless temperature sensor.
Figure 4:
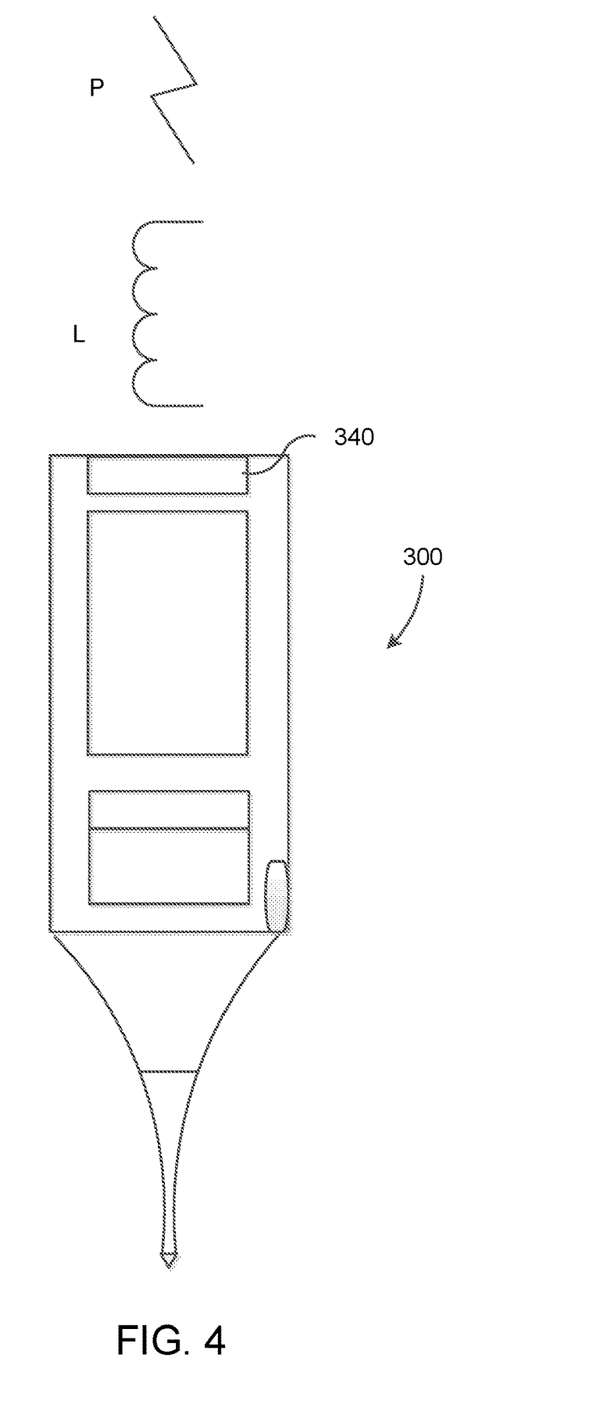
FIG. 4 is a view of an example embodiment of a wireless temperature sensor.

FIGS. 3 and 4 illustrate views of a wireless temperature sensor. The wireless temperature sensor 300 can include an upper portion 310, a middle portion 320, and a lower portion 330. In alternate embodiments, wireless temperature sensor 300 can include two portions or one portion. The upper portion 310 can include a housing 314. The housing 314 can be configured to enclose a controller 316, a wireless radio 318 and a battery 312. The housing can further include an opening (not shown) configured to be opened and closed (i.e., by the user). For example, the housing can open to enable replacement of battery 312. In other examples, the opening can enable installation or access to a universal serial bus-c port for transmitting/receiving data through a wired connection and/or charging battery 312. The controller 316 can be configured to communicate by the wireless radio 318 with the device 105 (e.g., to adjust the temperature and cook time in response to a current temperature). The wireless radio 318 can communicate to a sous-vide cooker 105 by Wi-Fi, BLUETOOTH®, Near Field Communication (NFC), Infrared (IR), Radio Frequency (RF) or any other wireless transmission medium. The battery 312 can be a disposable battery, (e.g., an alkaline battery) or can be a rechargeable battery, (e.g., a lithium ion battery). The battery 312 can be recharged wirelessly through inductance (as shown in FIG. 4). The battery 312 can be recharged through wired connection to a power source. In another embodiment, the wireless temperature sensor 300 can have a peltier semiconductor wafer configured to allow assisted self-charging through natural passive heating.

The middle portion 320 can be connected to the upper portion 310. The middle portion 320 comprises a substantially hollow tube structure configured to accommodate a plurality of temperature sensing wires 322. The plurality of temperature sensing wires 332 can couple components (e.g., controller 316, etc.) with temperature sensing mechanism 334.

The lower portion 330 can include a lower housing 332 and a temperature sensing mechanism 334. The temperature sensing mechanism 334 can be a temperature RTD resistor, a thermistor, or a thermocouple.

The wireless temperature sensor 300 can further include a battery indicator 315. The battery indicator 315 can be a light that illuminates when the battery level falls below a predetermined level. In another embodiment, the battery indicator 315 can be a light that illuminates a first color indicating the battery level is acceptable, and illuminates a second color indicating the battery has fallen below the predetermined level (e.g., green, amber, and/or red).

FIG. 4 illustrates a wireless temperature sensor configured to charge through inductance. The wireless temperature sensor 300 can include a rechargeable battery 312. The battery 312 can charged through inductance L from power source P. For example, wireless temperature sensor 300 can include a coil 340 for receiving energy through electromagnetic induction (e.g., from a charging station with a primary coil).

Figure 5:
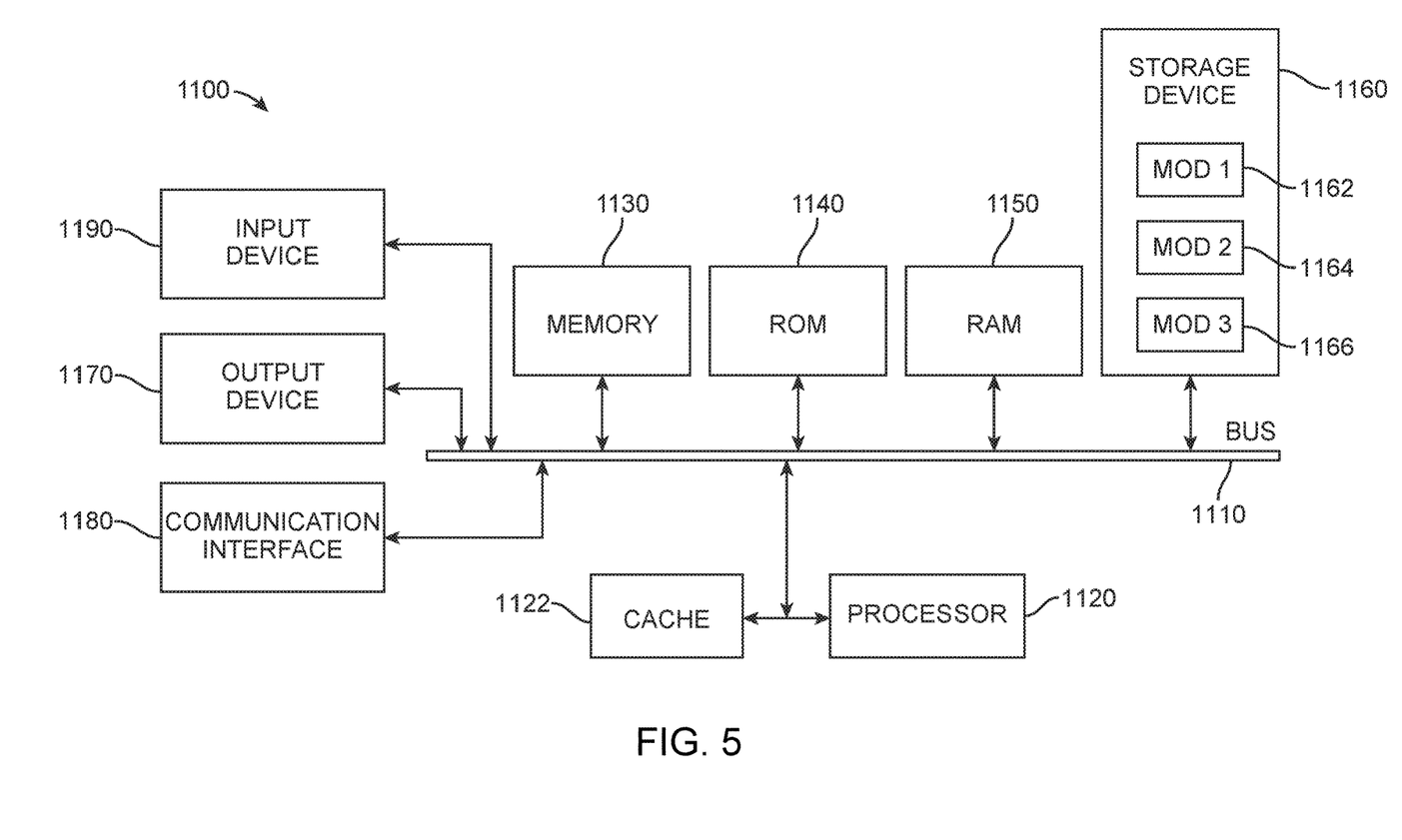
FIG. 5 is a system and/or control unit for a fluidic temperature control device or related electronic device in accordance with an example embodiment.

FIG. 5 illustrates an example system and/or control unit 1100 of device 105 and/or sensor 300 including a processing unit (for example, a central processing unit (CPU) or processor) 1120 and a system bus 1110 that couples various system components, including the system memory 1130 such as read only memory (ROM) 1140 and random access memory (RAM) 1150, to the processor 1120. The system 1100 can include a cache 1122 of high-speed memory connected directly with, in close proximity to, or integrated as part of the processor 1120. The system 1100 can copy data from the memory 1130 and/or the storage device 1160 to the cache 1122 for access by the processor 1120. These and other modules can control or be configured to control the processor 1120 to perform various operations or actions. The memory 1130 can include multiple different types of memory with different performance characteristics.

Multiple processors or processor cores can share resources such as memory 1130 or the cache 1122, or can operate using independent resources. The processor 1120 can include one or more of a state machine, an application specific integrated circuit (ASIC), or a programmable gate array (PGA) including a field PGA. The system bus 1110 can be any of several types of bus structures including a memory bus or memory controller, a peripheral bus, and a local bus using any of a variety of bus architectures. A basic input/output (BIOS) stored in ROM 1140 or the like, can provide the basic routine that helps to transfer information between elements within the computing device 1100, such as during start-up.

The computing device 1100 can further include storage devices 1160 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. The storage device 1160 can include software modules 1162, 1164, 1166 for controlling the processor 1120. The system 1100 can include other hardware or software modules. Although the exemplary embodiment(s) described herein employs the hard disk as storage device 1160, other types of computer-readable storage devices which can store data that are accessible by a computer, such as magnetic cassettes, flash memory cards, digital versatile disks (DVDs), cartridges, random access memories (RAMs) 1150, read only memory (ROM) 1140, a cable containing a bit stream and the like can also be used in the exemplary operating environment. Tangible computer-readable storage media, computer-readable storage devices, or computer-readable memory devices, expressly exclude media such as transitory waves, energy, carrier signals, electromagnetic waves, and signals per se.

The basic components and appropriate variations can be modified depending on the type of device, such as whether the device 1100 is a small, handheld computing device, a desktop computer, or a computer server. When the processor 1120 executes instructions to perform "operations", the processor 1120 can perform the operations directly and/or facilitate, direct, or cooperate with another device or component to perform the operations.

To enable user interaction with the computing device 1100, an input device 1190 represents any number of input mechanisms, such as a microphone for speech, a touch-sensitive screen for gesture or graphical input, keyboard, mouse, motion input, scroll wheel, speech and so forth. An output device 1170 can also be one or more of a number of output mechanisms known to those of skill in the art. In some instances, multimodal systems enable a user to provide multiple types of input to communicate with the computing device 1100. The communications interface 1180 generally governs and manages the user input and system output. There is no restriction on operating on any particular hardware arrangement and therefore the basic hardware depicted can easily be substituted for improved hardware or firmware arrangements as they are developed.

One or more parts of the example computing device 1100, up to and including the entire computing device 1100, can be virtualized. For example, a virtual processor can be a software object that executes according to a particular instruction set, even when a physical processor of the same type as the virtual processor is unavailable.

Figure 6:
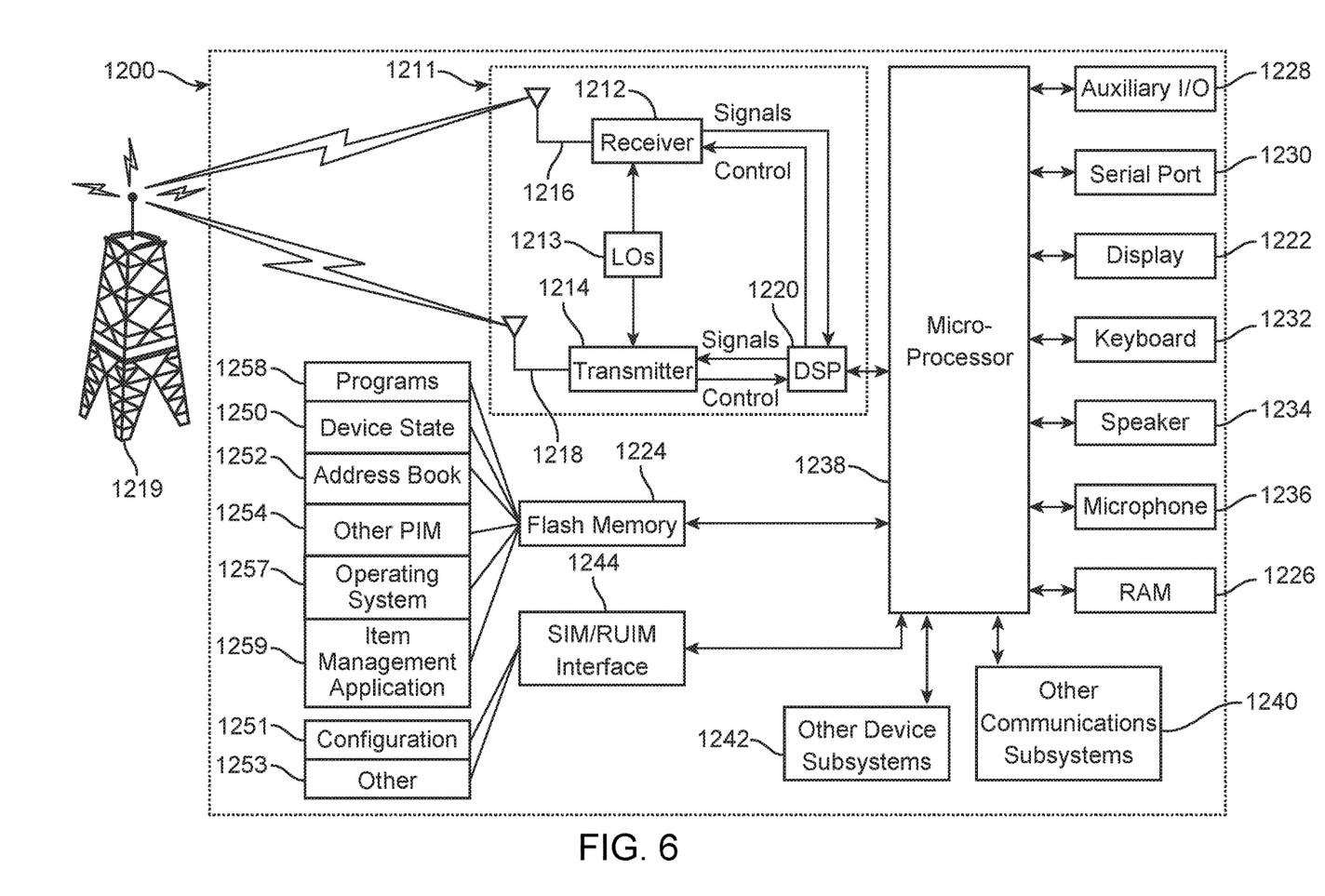
FIG. 6 is a block diagram of an electronic device in accordance with an example implementation is illustrated.

FIG. 6 is a block diagram illustrating an electronic device for controlling a fluidic temperature control device and/or wireless temperature sensor 300. Electronic device 1200 can include fluidic temperature control device 105, a sous-vide cooker, components of a sous-vide cooker, an electronic device used to control device 105, professional electronic devices 375, and/or client electronic devices 350. Electronic device 1200 includes a microprocessor 1238 that controls the operation of the electronic device 1200. A communication subsystem 1211 performs communication transmission and reception with the wireless network 1219. The microprocessor 1238 can be communicatively coupled with an auxiliary input/output (I/O) subsystem 1228 and/or to a serial port (for example, a Universal Serial Bus port) 1230 which can allow for communication with other devices or systems. A display 1222 can be communicatively coupled to microprocessor 1238 to allow for displaying of information to an user of the electronic device 1200. The electronic device 1200 can include a keyboard, 1231, speaker 1234, a microphone, 1236, random access memory (RAM) 1226, and flash memory 1224, all of which can be communicatively coupled to the microprocessor 1238. Other similar components can be provided on the electronic device 1200 as well and optionally communicatively coupled to the microprocessor 1238. Other communication subsystems 1240 and other electronic device subsystems 1242 can be communicatively coupled with the microprocessor 1238. For example, a short range communication system such as BLUETOOTH® communication module or a WI-FI®) communication module (a communication module in compliance with IEEE 802.11b). Microprocessor 1238 is configured to perform operating system functions and enables execution of programs on the electronic device 1200. In some implementations not all of the above components can be included in the electronic device 1200. For example, in at least one implementation, the keyboard 1232 is not provided as a separate component and is instead integrated with a touchscreen as described below.

Electronic device 1200 can be equipped with components to enable operation of various programs. In at least one embodiment, flash memory 1224 is enabled to provide a storage location for the operating system 1257, device programs 1258, Address book 1252, PIM 1254 and item management application 1259. The operating system 1257 is generally configured to manage programs 1258 that are also stored in memory 1224 and executable on the microprocessor 1238. The operating system 1257 is configured to service requests made by programs 1258 through predefined program 1258 interfaces. More specifically, the operating system 1257 typically determines the order in which multiple programs 1258 are executed on the microprocessor 1238 and the execution time allotted for each program 1258, manages the sharing of memory 1224 among multiple programs 1258, handles input and output to and from other device subsystems 1242. In addition, users can typically interact directly with the operating system 1257 through a user interface shown on display screen 1222. In at least one embodiment, the operating system 1257 is stored in flash memory 1224; the operating system 1257 in other implementations is stored in read-only memory (ROM) or similar storage element (not shown). As those skilled in the art will appreciate, the operating system 1257, device program 1258 or parts thereof can be loaded in RAM 1226 or other volatile memory.

Electronic device 1200 can be enabled for two-way communication within the wireless communication network 1219. The electronic device 1200 can send and receive signals from a mobile communication service. Examples of communication systems enabled for two-way communication include, but are not limited to, the General Packet Radio Service (GPRS) network, the Universal Mobile Telecommunication Service (UMTS) network, the Enhanced Data for Global Evolution (EDGE) network, the Code Division Multiple Access (CDMA) network, High-Speed Packet Access (HSPA) networks, Universal Mobile Telecommunication Service Time Division Duplexing (UMTS-TDD), Ultra Mobile Broadband (UMB) networks, Worldwide Interoperability for Microwave Access (WiMAX), and other networks that can be used for data and voice, or just data or voice. For the systems listed above, the electronic device 1200 can use a unique identifier to enable the electronic device 1200 to transmit and receive signals from the communication network 1219. Other systems can operate without such identifying information. GPRS, UMTS, and EDGE use a smart card such as a Subscriber Identity Module (SIM) in order to allow communication with the communication network 1219. Likewise, most CDMA systems use a Removable User Identity Module (RUIM) in order to communicate with the CDMA network. A smart card can be used in multiple different electronic devices 1200. The electronic device 1200 can perform some operations without a smart card, but the electronic device 1200 cannot be able to communicate with the network 1219. A smart card interface 1244 located within the electronic device 1200 can enable the removal or insertion of a smart card (not shown). The smart card features memory and holds key configurations 1251, and other information 1253 such as identification and subscriber related information.

Electronic device 1200 can be enabled to both transmit and receive information from the communication network 1219. In order to enable communication with the network 1219, the electronic device 1200 can be equipped with an integral or internal antenna 1218 for transmitting signals to the communication network 1219. Electronic device 1200 can be equipped with antenna 1216 for receiving communication from the communication network 1219. Antennas (1216, 1218) in another embodiment can be combined into a single antenna. As one skilled in the art would appreciate, the antenna or antennae (1216, 1218) in another implementation are externally mounted on the electronic device 1200.

Communication subsystem 1211 can be configured to support the operational needs of the electronic device 1200. The subsystem 1211 includes a transmitter 1214 and receiver 1212 including the associated antenna or antennae (1216, 1218) as described above, local oscillators (LOs) 1213, and a processing module 1220 for example a digital signal processor (DSP).

Communication between the electronic device 1200 and wireless network 1219 can be any type of communication that both the wireless network 1219 and electronic device 1200 are enabled to transmit, receive and process. In general, the communication can be classified as voice and data.

Voice communication generally refers to communication in which signals for audible sounds are transmitted by the electronic device 1200 through the communication network 1219. Data generally refers to all other types of communication that the electronic device 1200 is capable of performing within the constraints of the wireless network 1219.

The keyboard 1232 can include a plurality of keys that can be physical buttons or the plurality of keys can be of a software nature, typically constituted by virtual representations of physical keys on the display screen 1222 (referred to herein as "virtual keys"). The user input can be provided as a combination of the two types of keys. Each key of the plurality of keys can have at least one action which can be the input of indicia such as a character, a command or a function. "Characters" are contemplated to exemplarily include alphabetic letters, language symbols, numbers, punctuation, insignias, icons, pictures, and even a blank space.

In the case of virtual keys, the indicia for the respective keys are shown on the display screen 1222, which in one implementation is enabled by touching the display screen 1222, for example, with a stylus, finger, or other pointer, to generate the character or activate the indicated command or function. Some examples of display screens 1222 capable of detecting a touch include resistive, capacitive, projected capacitive, infrared and surface acoustic wave (SAW) touchscreens.

Physical and virtual keys can be combined in many different ways as appreciated by those skilled in the art. In one implementation, physical and virtual keys are combined such that the plurality of enabled keys for a particular program or feature of the electronic device 1200 is shown on the display screen 1222 in the same configuration as the physical keys. Using the configuration just described, the operator can select the appropriate physical key corresponding to what is shown on the display screen 1222. Thus, the desired character, command or function is obtained by depressing the physical key corresponding to the character, command or function displayed at a corresponding position on the display screen 1222, rather than touching the display screen 1222.

While the above description generally describes the systems and components associated with a handheld electronic device, the electronic device 1200 could be another electronic device such as a PDA, a laptop computer, desktop computer, a server, or other electronic device. The electronic device 1200 can comprise different components or the above system might be omitted in order to provide the desired electronic device 1200. Additionally, other components not described above can be used to allow the electronic device 1200 to function in a desired fashion. The above description provides only general components and additional components can be used to enable the system to function. The additional systems and components would be appreciated by those of ordinary skill in the art The term "comprising", which is synonymous with "including," "containing," or "charac-terized by" is inclusive or open-ended and does not exclude additional, unrecited elements or method steps. "Comprising" is a term of art used in claim language which means that the named elements are present, but other elements can be added and still form a construct or method within the scope of the claim.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as can be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk™. The network can be, for example, a local area network, a wide-area network, a virtual private network, the Internet, an intranet, an extranet, a public switched telephone network, an infrared network, a wireless network, and any suitable combination thereof.

In embodiments utilizing a Web server, the Web server can run any of a variety of server or mid-tier applications, including HTTP servers, FTP servers, CGI servers, data servers, Java servers, and business application servers. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, or TCL, as well as combinations thereof. The server(s) can also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information can reside in a storage-area network ("SAN") familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and at least one output device (e.g., a display device, printer, or speaker).

Such a system can also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device.

Embodiments of the present disclosure can be provided as a computer program product including a non-transitory machine-readable storage medium having stored thereon instructions (in compressed or uncompressed form) that can be used to program a computer (or other electronic device) to perform processes or methods described herein. The machine-readable storage medium can include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments can also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software can be via Internet download.

Based on the disclosure and teachings provided herein, it will be understood that other ways and methods of implementing the various embodiments described above are possible. The specification and drawings are illustrative and are not to be construed as limiting the scope of the following claims.

The invention claimed is:

1. A precision temperature cooking system comprising:
   a fluid agitation device;
   a heating element;
   at least one processor;
   a wireless temperature sensor comprising:
      a temperature sensor coupled to a plurality of temperature sensor wires and configured to determine a current temperature,
      a housing enclosing a controller, a battery, a wireless radio, and a plurality of temperature sensor wires,
      wherein the controller is configured to receive via the plurality of temperature sensor wires the current temperature, and
      the wireless radio is configured to transmit the current temperature to the at least one processor; and
   at least one memory, the memory storing instructions which when executed by the processor cause the processor to:
      actuate the fluid agitation device and the heating element to heat a fluid of a fluid container to a predetermined temperature;
      receive, via a wireless network connection from the wireless temperature sensor in the fluid of the fluid container, a current temperature; and
      adjust at least one of the fluid agitation device and the heating element when the current temperature is not equal to the predetermined temperature.

2. The precision temperature cooking system of claim 1, wherein the temperature sensor is at least one of an RTD resistor, thermistor or thermocouple.

3. The precision temperature cooking system of claim 1, further comprising an indicator configured to indicate a level of the battery.

4. The precision temperature cooking system of claim 1 wherein the housing is water-resistant and configured to operate in hot water.

5. The precision temperature cooking system of claim 1, further comprising a peltier wafer to enable the sensor to self-power though passive heat flow.

6. The precision temperature cooking system of claim 1, further comprising an inductive element configured to charge the battery.

7. The precision temperature cooking system of claim 1, wherein the controller is configured to transmit, via the wireless radio, a new current temperature at predetermined intervals.

8. The precision temperature cooking system of claim 1, wherein the housing comprises an upper portion, a middle portion and a lower portion.

9. The precision temperature cooking system of claim 1, wherein the housing comprises an upper portion, and a lower portion.

10. The precision temperature cooking system of claim 1, wherein the housing comprises a single portion.

11. The precision temperature cooking system of claim 1, wherein the wireless temperature sensor comprises:
    an upper portion having a housing enclosing a controller, a wireless radio and a battery;
    a middle portion connected to the upper portion and comprising a substantially hollow tube structure enclosing a plurality of temperature sensor wires therethrough; and
    a lower portion coupled to the middle portion and comprising a temperature sensor.

12. The precision temperature cooking system of claim 11, wherein the temperature sensor is configured to read and transmit a temperature to the controller; and the controller is configured to transmit the temperature via the wireless radio to a sous vide cooker.

13. The precision temperature cooking system of claim 11, wherein the temperature sensor is at least one of an RTD resistor, thermistor or thermocouple.

14. The precision temperature cooking system of claim 11, wherein the upper portion has an indicator configured to indicate a level of the battery.

15. The precision temperature cooking system of claim 11, wherein the upper portion is water-resistant and configured to operate in hot water.

16. The precision temperature cooking system of claim 11, wherein the upper portion contains a peltier wafer configured to self-power the system though passive heat flow.

17. The precision temperature cooking system of claim 11, wherein the upper portion further includes an inductive element configured to charge the battery.

18. The system of claim 1, comprising further instructions which when executed by the processor cause the processor to:
    transmit, via the wireless network connection to the wireless temperature sensor, a request for a temperature.

* * * * *